(12) United States Patent
Montocchio

(10) Patent No.: US 8,948,974 B2
(45) Date of Patent: Feb. 3, 2015

(54) AUTOMATED DUMP BODY TIP CONTROL FOR ADTS TO TIP MATERIAL WITH STABILITY AND SPREAD MATERIAL

(75) Inventor: Denis J. Montocchio, Dubuque, IA (US)

(73) Assignee: Deere & Company, Moline, IL (US)

( * ) Notice: Subject to any disclaimer, the term of this patent is extended or adjusted under 35 U.S.C. 154(b) by 1690 days.

(21) Appl. No.: 12/246,288

(22) Filed: Oct. 6, 2008

(65) Prior Publication Data
US 2010/0084908 A1   Apr. 8, 2010

(51) Int. Cl.
*G06F 7/70* (2006.01)
*B60P 1/28* (2006.01)

(52) U.S. Cl.
CPC ................................. *B60P 1/283* (2013.01)
USPC ........................................................ 701/50

(58) Field of Classification Search
USPC .................................. 701/50, 36, 38, 49, 124
See application file for complete search history.

(56) References Cited

U.S. PATENT DOCUMENTS

| | | | | |
|---|---|---|---|---|
| 3,113,784 A | * | 12/1963 | Swenson et al. | 239/657 |
| 3,966,254 A | * | 6/1976 | Guhl et al. | 298/22 C |
| 4,723,817 A | * | 2/1988 | Wallan | 298/23 MD |
| 5,327,347 A | * | 7/1994 | Hagenbuch | 701/50 |
| 5,631,835 A | * | 5/1997 | Hagenbuch | 701/50 |
| 5,650,930 A | * | 7/1997 | Hagenbuch | 701/50 |
| 5,742,914 A | * | 4/1998 | Hagenbuch | 701/35 |
| 5,995,888 A | * | 11/1999 | Hagenbuch | 701/35 |
| 6,026,341 A | * | 2/2000 | Harrod | 701/50 |
| 6,134,493 A | * | 10/2000 | Kaneko | 701/50 |
| 6,170,916 B1 | * | 1/2001 | Lawson | 298/23 MD |
| 6,195,610 B1 | * | 2/2001 | Kaneko | 701/200 |
| 6,302,491 B1 | * | 10/2001 | Anderson | 298/23 S |
| 6,321,153 B1 | * | 11/2001 | Rocke et al. | 701/50 |
| 6,385,519 B2 | * | 5/2002 | Rocke | 701/50 |
| 7,247,803 B2 | * | 7/2007 | Takeda et al. | 177/137 |
| 7,599,777 B2 | * | 10/2009 | Passeri et al. | 701/50 |
| 7,894,961 B2 | * | 2/2011 | Blackburn et al. | 701/50 |
| 2007/0260380 A1 | * | 11/2007 | Mintah et al. | 701/50 |
| 2008/0208416 A1 | * | 8/2008 | Yuet et al. | 701/50 |
| 2010/0106358 A1 | * | 4/2010 | Lu et al. | 701/29 |
| 2010/0131158 A1 | * | 5/2010 | Saito | 701/50 |

FOREIGN PATENT DOCUMENTS

JP         60 234042        11/1985
WO    WO 2006/058904       6/2006

OTHER PUBLICATIONS

European Search Report and Written Opinion for EP2009171328.9 issued by the European Patent Office dated Apr. 15, 2010.
Caterpillar 740 Ejector Articulated Truck pamphlet, pp. 1-21, http://www.cat.com/cmms/images/C516225.pdf.

* cited by examiner

*Primary Examiner* — Samir Abdosh
(74) *Attorney, Agent, or Firm* — Faegre Baker Daniels LLP

(57) ABSTRACT

An articulated vehicle is provided including a system for controlling the rate and stability of unloading of material supported by the articulated vehicle.

20 Claims, 5 Drawing Sheets

AUTOMATED DUMP BODY TIP CONTROL FOR ADTS TO TIP MATERIAL WITH STABILITY AND SPREAD MATERIAL

FIELD OF THE INVENTION

The present invention relates to articulated vehicles and, more particularly, to dumping loads carried by the articulated vehicles.

BACKGROUND AND SUMMARY OF THE INVENTION

Articulated vehicles, such as articulated dump trucks (ADT's) are well-known in the art. For example, ADT's typically include a cab portion having a first frame supporting an operator cab, and a trailer portion having a second frame supporting a bin. The bin is configured to contain a load and is typically coupled to an actuator for angular movement relative to the second frame. The first frame and the second frame may be operably coupled through a universal joint including a pivot frame coupling for providing articulated movement of the first frame relative to the second frame about a vertical axis, and an oscillation frame coupling for providing oscillatory movement of the second frame relative to the first frame about a longitudinal axis.

To reduce jobsite labor, it is helpful if the ADT provides an even spread when unloading material. Otherwise, piles are created that may requires spreading by other equipment and their operators. Additionally, it is beneficial if the amount of time required to unload the ADT is reduced. This allows the cycle time for each loading and unloading run to be reduced, which lowers fuel costs and raises vehicle utilization. Additionally, it is helpful that when the ADT tips its load, when the vehicle is stationary, or when it is moving and spreading the load, that the rear frame and bin are stable during tipping.

According to one aspect of the present disclosure, a transport vehicle is provided that is configured to transport a load. The vehicle includes a chassis; a plurality of wheel assembles operably coupled to the chassis to provide rolling support for the chassis; a load bin supported by the chassis and configured to support a load transported by the transport vehicle; at least one load bin actuator configured to move the load bin between raised and lowered positions; and means for controlling the at least one load bin actuator to optimize spreading of the load at a dump site.

According to another aspect of the present disclosure, a transport vehicle is provided that configured to transport a load. The vehicle includes a chassis; a plurality of wheel assembles operably coupled to the chassis to provide rolling support for the chassis; a load bin supported by the chassis and configured to support a load transported by the transport vehicle; at least one load bin actuator configured to move the load bin between raised and lowered positions; and a controller receiving inputs including at least one of the vehicle speed, the vehicle inclination, the weight of the load supported by the load bin, and type of material supported by the load bin to control the operation of the at least one load bin actuator.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
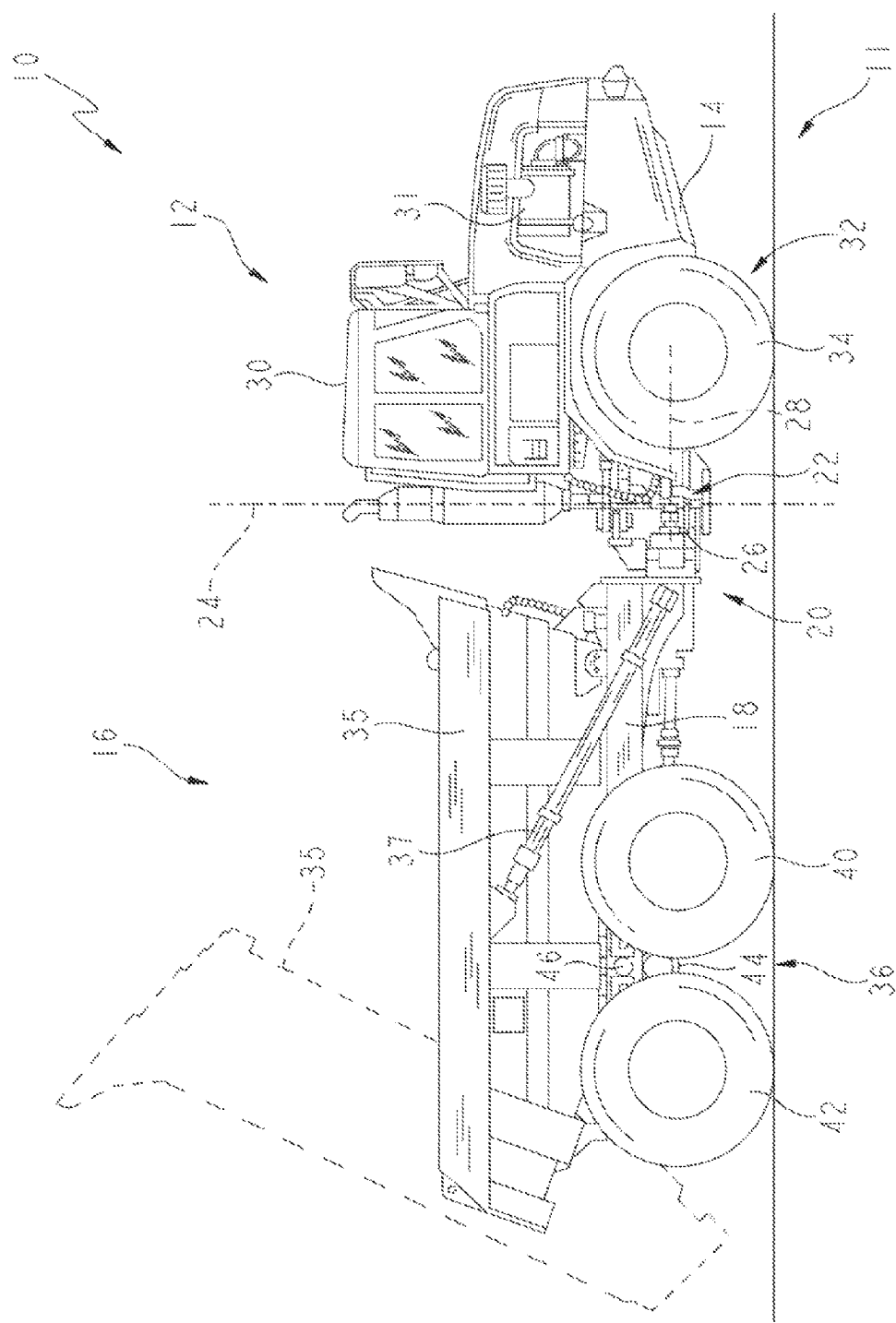
FIG. 1 is a side elevational view of an illustrative embodiment articulated vehicle showing the vehicle including an articulated chassis and a dump bin (shown also in phantom in a raised dumping position)

Referring to FIG. 1, an articulated vehicle 10 of the present embodiment illustratively includes a chassis 11 having a first or cab portion 12 and a second or trailer portion 16. Cab portion 12 includes a first frame 14 and trailer portion 16 includes a second frame 18. First frame 14 is connected to second frame 18 through a coupling assembly 20. Coupling assembly 20 includes a pivot frame coupling 22 which provides for articulated movement, or turning, of second frame 18 relative to first frame 14 about a vertical axis 24. Coupling assembly 20 further includes an oscillatory frame coupling 26 which provides for pivoting movement, or oscillation, of the second frame 18 relative to the first frame 14 about a longitudinal axis 28. Although an articulated dump truck is shown and described herein, the features of the present disclosure may be provided on other vehicles, such as non-articulated dump trucks.

First frame 14 supports an operator's cab 30 and an engine 31 for propelling vehicle 10. A first or front wheel assembly 32 supports cab portion 12 and is operably coupled to first frame 14. First wheel assembly 32 includes a pair of wheels 34.

A bin 35 for containing a load of material is supported by second frame 18. An actuator, such as a hydraulic or other cylinder 37, may be coupled to bin 35 for angularly elevating bin 35 relative to second frame 18 (as shown in phantom in FIG. 1). Left and right rear wheel assemblies 36 support second frame 18 and each illustratively includes a front wheel 40 and a rear wheel 42. Each of front wheels 40 and rear wheels 42 are rotatably coupled to a tandem or walking beam 44. Tandem 44 is pivotally coupled to second frame 18 through a pivot tandem coupling 46. Operation of tandem 44 facilitates pivoting movement of front wheel 40 and rear wheel 42 about coupling 46, thereby facilitating continuous ground engagement by wheels 40, 42. As shown in FIG. 1, coupling 46 consists of a rigid shaft that extends from second frame 18 to the tandem 44 to provide the pivoting therebetween. Other than rotation, shaft 46 has a fixed position relative to second frame 18 so that shaft 46 always moves vertically, longitudinally, and laterally with second frame 18.

During operation, vehicle 10 travels to a loading area to be loaded with material, such as clay, sand, soil, loam, rock, aggregate stone, blast rock, or other materials. A loader (not shown) places material in bin 35 and vehicle 10 transports the material loaded in bin 35 to a dump site. At the dump site, vehicle 10 raises bin 35 so that material slides out a back end of bin 35 onto the ground.

Figure 2:
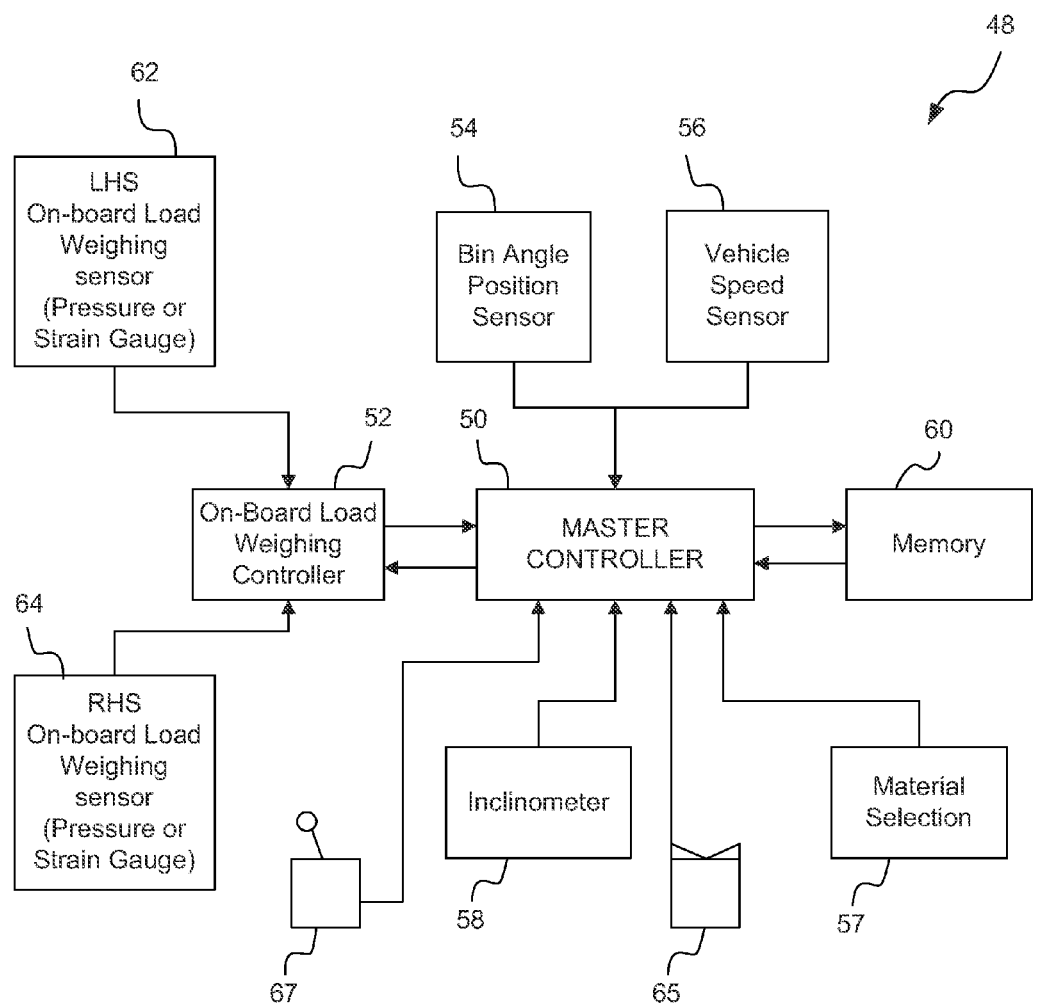
FIG. 2 is a schematic view of a dump system that controls the position of the dump bin during unloading of materials loaded into the dump bin.

According to the present disclosure, vehicle 10 includes a dump system 48 that controls dump cylinders 37 to raise and lower bin 35 and optimize the spread of the material on the ground. As shown in FIG. 2, dump system 48 includes a master controller 50 that receives inputs from various sources and controls dump cylinders 37 to raise bin 35 and dump the material from bin 35. Inputs to master controller 50 may include load weighing controller 52, bin angle sensor 54, vehicle speed sensor 56, material selector 57, an inclinometer 58, system memory 60, and/or other inputs.

Load weighing controller 52 receives inputs from left hand load weighing sensor 62 and right hand load weighing sensor 64 that detect the amount of weight supported by the right and left hand sides of bin 35 to determine how much weight and material is loaded into bin 35 and the dynamics of the load. According to the preferred embodiment of the present disclosure, left and right sensor 62, 64 are pressure or strain gauges positioned between respective left and right ends of shaft 46 and tandem 44. According to an alternative embodiment, tandem 44 is replaced by a hydraulic suspension and the weighing sensors are positioned within the hydraulic suspension.

Figure 3:
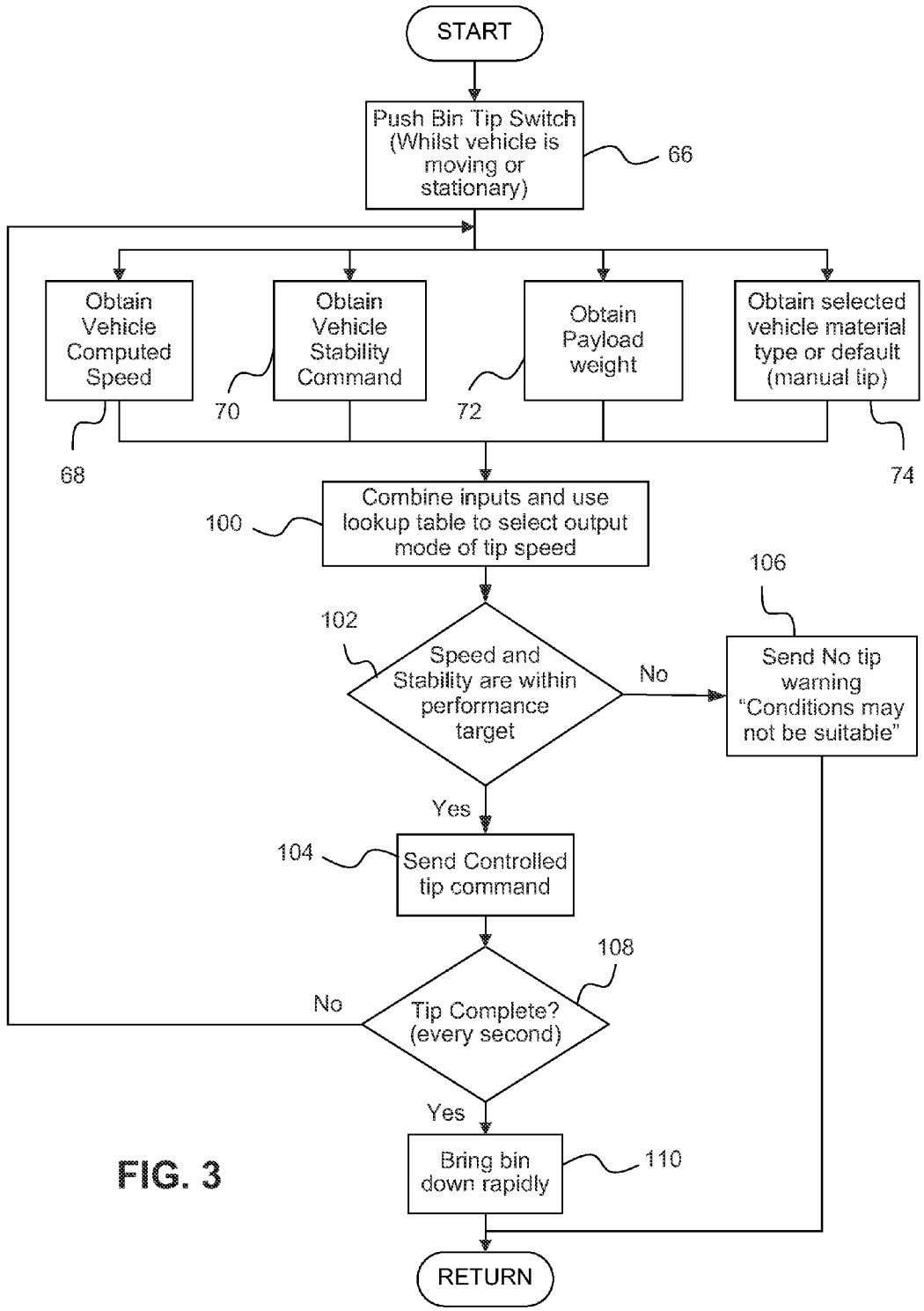
FIG. 3 is a flow chart showing a process used by the dump system to control the position of the dump bin.

Based on the input, master controller 50 controls a dumping process shown in FIG. 3 to control the flow of hydraulic fluid to cylinders 37. The flow of fluid controls the angle of bin 35, which controls the rate of dumping of the material. To begin the operation, the vehicle operator switches a bin tip rocker switch 65 at activation step 66. The operator may push switch 65 while vehicle 10 is moving forwarding while entering the dump area so that dumping occurs while vehicle 10 continues moving through the dump area. Because vehicle 10 does not stop during dumping, it takes less time for vehicle 10 to dump, decreases the load-to-dump cycle time, and decreases the amount of fuel used. When bin tip rocker switch 65 is not in the on position, the operator can raise and lower bin 35 with a standard bin raise/lower lever 67. According to the exemplary embodiment, the dump process is always checked for stability regardless of whether bin 35 is raised or lowered automatically or manually with lever 67.

After bin tip switch 65 is moved to the on position at step 66, master controller 50 receives the vehicle speed at speed acquisition step 68. Controller 50 determines the stability of vehicle 10 at stabilization determination step 70, the payload weight at weight determination step 72, and the type of material loaded into bin 35 at material determination step 74. These steps 68, 70, 72, 74 may occur simultaneously or otherwise. The vehicle speed is provided by vehicle speed sensor 56, which may be a speedometer or other sensor that detects the speed of vehicle 10. The payload weight is provided by load weighing controller 52 based on inputs from load sensors 62, 64.

Figure 4:
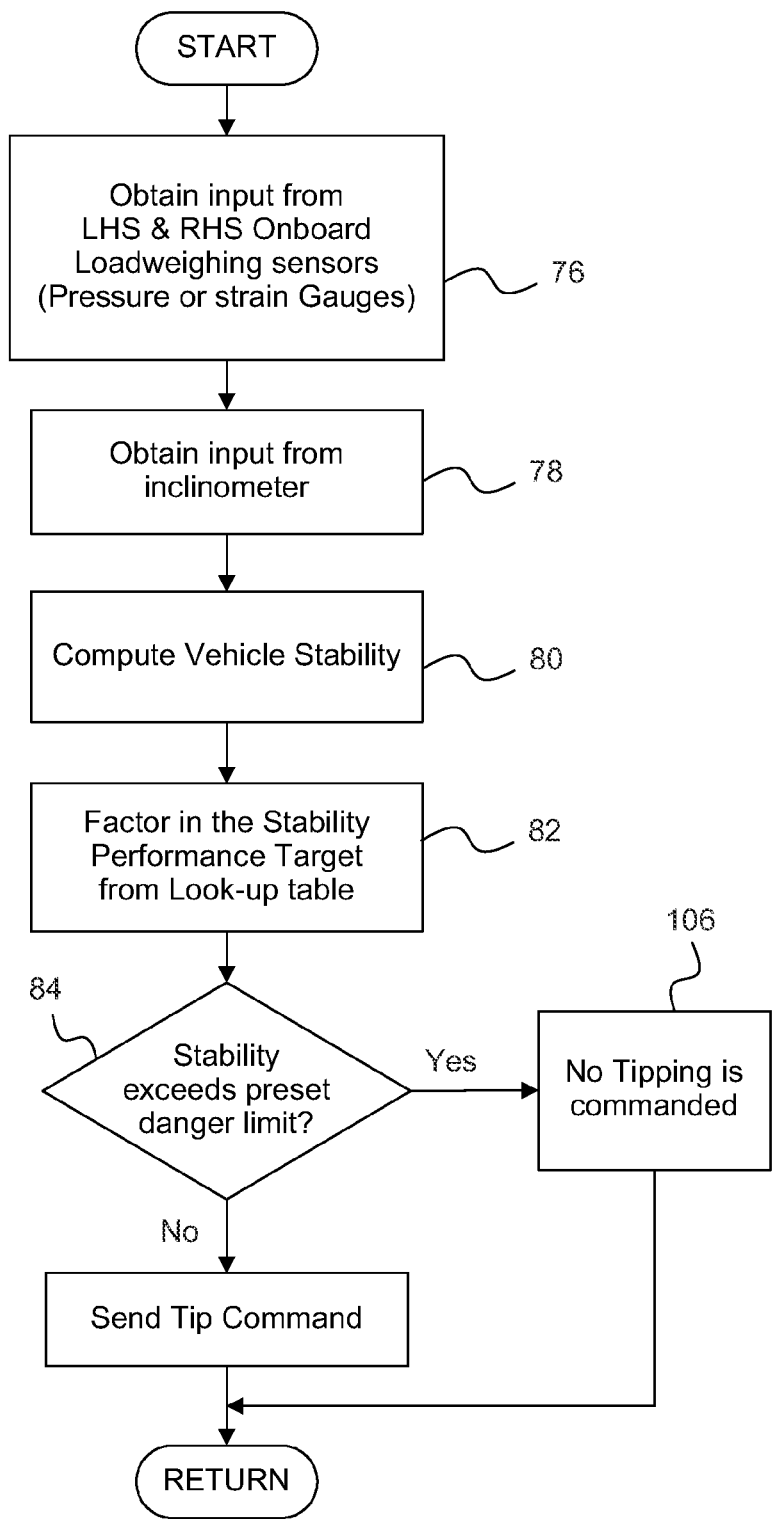
FIG. 4 is a flow chart showing a process of determining if the vehicle of FIG. 1 is stable enough to permit automatic bin dumping and stable enough to provide stationary dumping.

Controller 50 determines the stability of vehicle 10 through a process shown in FIG. 4. First, controller 50 determines the amount of weight supported by right and left sides of tandem 44 sensed by left and right sensors 62, 64. Controller 50 monitors changes in the weight sensed by left and right sensors 62, 64 to determine a component of the stability of vehicle 10. For example, if either of sensors 62, 64 detect rapid or repeated changes in weight, controller 50 may interpret these rapid changes as caused by vehicle 10 traveling over rough terrain, which will lower the stability of vehicle 10. Additionally, controller 50 may interpret differences in the weight sensed by left and right sensors 62, 64 as an indication of instability. For example, if one sensor 62, 64 detects more weight than the other, controller 50 may interpret the difference as a shift in the load carried by bin 35, which may cause vehicle 10 to be less stable.

As part of the stability determination, controller 50 also determines the forward-to-rear rear inclination of vehicle 10 based on input from inclinometer 58 at inclination determination step 78. As the inclination increases, vehicle 10 becomes less stable.

Based on these inputs, controller 50 determines a stability value of vehicle 10 at stability determination step 80. Controller 50 then retrieves a stability performance target from a table in system memory 60 and factors in the stability performance target into the vehicle stability at step 82. Controller 50 then determines if the computed vehicle stability is within an acceptable range in comparison step 84 based on the detected speed of vehicle 10. For example, if the vehicle inclination is above a predetermined angle for a particular vehicle speed, the vehicle stabilization will not be within the acceptable range. In another example, if the terrain is too rough for a particular vehicle speed, the vehicle stabilization will not be within the acceptable range. If the terrain is smooth enough, the vehicle inclination is low enough, the load in bin 35 is balanced enough, and the vehicle speed is low enough, the vehicle stability will be suitable. According to alternative embodiments, fewer or more factors are used to determine if the vehicle stability is suitable, such as the type of material hauled (as discussed below), or other factors. Although factoring in the stability of vehicle 10 is preferred, it is not necessary. Similarly, the other features (and sub-features) described herein may not be provided in alternative embodiments.

If the vehicle stability is suitable, controller 50 proceeds to determine the variable bin tip rate as shown in FIG. 3. If the vehicle stability is not suitable, controller 50 provides an indication, such as a red light in cab 30, that automatic dumping is not suitable as shown in FIG. 3 at step 106.

Figure 5:
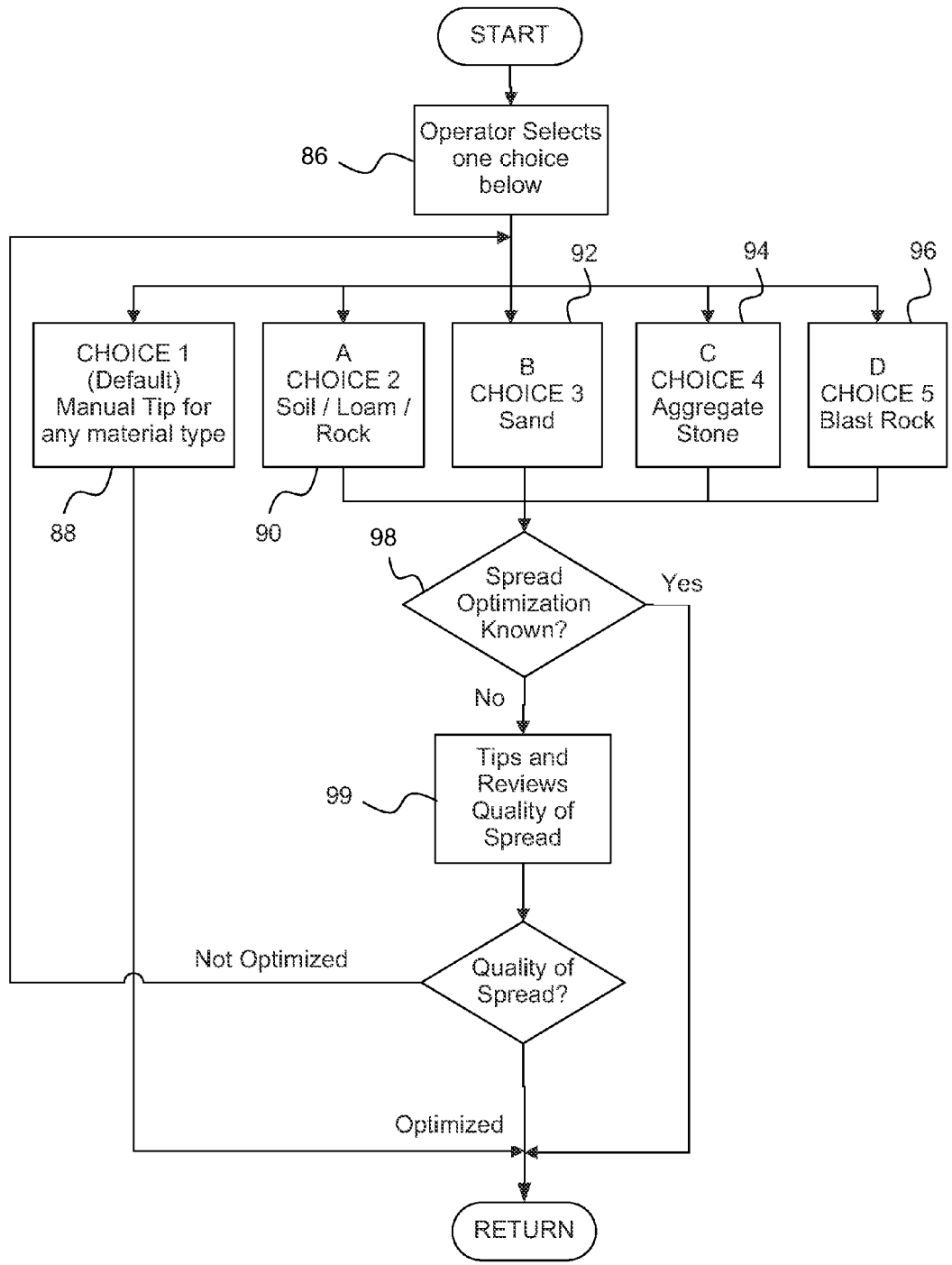
FIG. 5 is a flow chart showing a process of selecting a material type for use by the process of FIG. 3.

As shown in FIG. 3, controller 50 also attempts to factor in the type of material being hauled to determine the variable bin tip rate at step 74. As shown in FIG. 5, the vehicle operator selects either manual operation 88 or the type of material from various choices at selection step 86. According to the present embodiment, the operator selects from several choices. According to the present embodiment, these choices including soil/loam/rock 90, sand 92, aggregate stone 94, or blast rock 96. Rather than having material-specific labels as shown in FIG. 3, non-material specific labels may be provided (ex. "A," "B," "C," and "D") that each correspond to properties of different material types. Initially, the default choice is manual control. In manual control, the operator uses dump lever 67 to raise and lower bin 35 and during this process, the stability of the vehicle may be checked.

After receiving the initial load at a load area, the operator may choose a material type closest to one of soil/loam/rock, sand, aggregate stone, or blast rock. Before the initial dump, the spread quality/optimization of a particular selection 90, 92, 94, 96 is not known. Thus, at step 98 the operator does not know if the selected material type will result in the best spread. At step 100 (shown in FIG. 3) using the initial selection of material type, controller 50 selects a bin tip rate (as discussed in greater detail below) and vehicle 10 dumps the initial load from bin 35 in a controlled manner at step 104 (assuming the speed and stability are acceptable at step 102). If, as with the initial load, the spread quality is not known, the operator observes the spread quality/optimization of the dump at step 99 (shown in FIG. 5) after the initial dump at step 100. If the initial dump quality is optimized/sufficient, the operator leaves the choice of materials alone. If the dump quality is not optimized, the operator selects another material type for the next dump and continues the quality review and re-selection until the optimal choice is determined. Once the best choice for the loaded material is determined, the operator leaves the selection alone.

After a material is selected (or left alone), controller 50 combines the inputs at step 100, as mentioned above and shown in FIG. 3, to determine a bin tip rate. At bin elevation determining step 100, controller 50 uses the inputs to determine the speed of tipping bin 35 by referencing lookup tables stored in memory 60 to determine the bin tip rate. For example, if the vehicle speed is relatively fast, the reference table will indicate that bin 35 should be raised faster than if the vehicle speed was relatively slow.

If the material type is of the type that unloads more easily than another material type, the reference table will indicate that bin 35 should be raised slower than if the material was of a type that was not as easy to unload. Further, such a material will begin sliding off of bin 35 as a lesser angle of incline of bin 35.

For example, if the loaded material, such as sand, slides off bin 35 easier than another material, such as clay, bin 35 does not need to be raised as high. For example, sand will begin sliding off of bin 35 when bin 35 is raised slightly above horizontal and the tailgate, if provided, is raised. Whereas, clay may not start sliding off bin 35 until bin 35 is 45 degrees from horizontal. Thus, depending on the type of material selected, controller 50 will factor in the ability of the material to slide of into the specific bin tip rate. For example, if clay is being hauled, and the operator choices selection 90, as shown in FIG. 5, controller 50 will rapidly raise bin 35 to 40 degrees so that the clay will begin sliding off sooner.

Controller 50 may also factor in the angle of inclination of vehicle 10 to determine the rate of bin inclination and when to stop bin inclination. For example, if vehicle 10 is carrying clay and vehicle 10 is on a 10 degree grade, bin 35 only need to be raised 35 degrees relative to chassis 11 before the clay will start sliding off bin 35 (i.e. the 10 degree inclination of vehicle 10 detected by inclinometer 58 and the 35 degree bin angle of bin 35 put bin at 45 degrees relative to horizontal). As a result, controller 50 will rapidly raise bin 35 to 35 degrees relative to chassis 11.

To determine the stability, controller 50 may also factor in the material type. Because some materials, such as clay, require bin 35 to be raised higher for unloading, the maximum height of the center of gravity of bin 35 and the load in combination will be higher than for other materials that do not require bin 35 to be raised as high for unloading. This higher center of gravity makes vehicle 10 less stable. As a result, controller 50 will require vehicle 10 move at a slower speed or on more even terrain for one material selection, such as clay, than it would require for another material selection, such as sand, to maintain the stability of vehicle 10.

If controller 50 determines that the vehicle speed and stability are within the performance target at step 102, controller raises bin 35 using the preferred bin tip rate to provide a more even spread at dump bin tip command step 104. Otherwise, controller 50 sends a warning that conditions may not be suitable for dumping at warning step 106. In response to the warning, the operator may slow down vehicle 10. Controller 50 periodically recalculates the stability. If at the slower speed, controller 50 determines the stability is suitable, it will execute tip command 104. If not, the warning will continue until a slow enough vehicle speed is determined by the periodic recalculation.

After the tip command 104, controller 50 detects if the dump is complete at completion detection step 108. According to the preferred embodiment, controller 50 checks about ever second to determine if all weight is off of bin 35 or if bin 35 is at its maximum preferred tip height for the selected material (as discussed below). If controller 50 determines that the dump is not complete, controller 50 obtains the inputs again and recalculates the tip rate.

Because some materials, such as sand, start sliding off sooner, they also complete unloading sooner. For example, most of the sand will be unloaded from bin 35 by the time bin 35 reaches about 40 degrees relative to horizontal. Because controller 50 knows the material type (i.e. sand), it stops raising bin 35 at 40 degrees from horizontal and rapidly lowers bin 35. If controller 50 knows that the selected material type is clay, it will raise bin 35 higher than it would for sand because clay requires a greater angle to substantially unload from bin 35. For example, if controller 50 knows the material type is clay, it wall raise bin 35 to about 70 degrees from horizontal to substantially unload the clay and then rapidly lower bin 35. Thus, for different materials types, controller 50 begins rapidly lowering bin 35 at different bin angles and/or different angles of inclination of bin 35 from horizontal. This saves on the tip cycle time.

When controller 50 detects that the dump is complete, it brings bin 35 down quickly at dump bin return step 110 as discussed above. For example, according to one embodiment, controller 50 brings down bin 35 faster than it raised bin 35. After completion of the dump, vehicle 10 returns to the loading site for another load of material. When vehicle 10 returns to the dump site, the operator again presses rocker switch 65 to begin the dump process of FIG. 3. If the material type selection was sufficient for the previous load, the operator does not need to change the selection 90, 92, 94, 96.

Although the invention has been described in detail with reference to certain preferred embodiments, variations and modifications exist within the spirit and scope of the invention as described and defined in the following claims.

The invention claimed is:

1. A transport vehicle configured to transport a load including:
   a chassis;
   a plurality of wheel assembles operably coupled to the chassis to provide rolling support for the chassis;
   a load bin supported by the chassis and configured to support a load transported by the transport vehicle;
   at least one load bin cylinder configured to move the load bin between raised and lowered positions; and
   means for controlling the at least one load bin cylinder to optimize spreading of the load at a dump site.

2. The transport vehicle of claim 1, wherein the controlling means determines the speed of the vehicle to control the at least one load bin cylinder.

3. The transport vehicle of claim 2, wherein the controlling means includes a controller and a speedometer providing speed information to the controller.

4. The transport vehicle of claim 1 wherein the controlling means determines a material type of the load to control the at least one load bin cylinder.

5. The transport vehicle of claim 4, wherein the controlling means includes a controller and a plurality of material type selections providing an indication of the material type to the controller.

6. The transport vehicle of claim 1, wherein the controlling means determines the stability of the vehicle to control the at least one load bin cylinder.

7. The transport vehicle of claim 6, wherein the controlling means includes a controller and an inclinometer providing the angle of inclination of the vehicle to the controller to determine the stability of the vehicle.

8. The transport vehicle of claim 6, wherein the controlling means includes a controller and at least one load sensor providing weight information to the controller to determine the stability of the vehicle.

9. The transport vehicle of claim 1, wherein the controlling means determines the amount of material carried by the load bin to control the at least one load bin cylinder.

10. The transport vehicle of claim 9, wherein the controlling means includes a controller and at least one load sensor providing weight information to the controller to determine the amount of material carried by the load bin.

11. The transport vehicle of claim 1, wherein the controlling means includes an operator input to begin optimized spreading of the load.

12. The transport vehicle of claim 1, wherein the controlling means lowers the load bin after determining the angle of the load bin has reached a predetermined angle.

13. A transport vehicle configured to transport a load including:
- a chassis;
- a plurality of wheel assembles operably coupled to the chassis to provide rolling support for the chassis;
- a load bin supported by the chassis and configured to support a load transported by the transport vehicle;
- at least one load bin cylinder configured to move the load bin between raised and lowered positions; and
- a controller receiving inputs including at least one of the vehicle speed, the vehicle inclination, the weight of the load supported by the load bin, and type of material supported by the load bin to control the position of the at least one load bin cylinder.

14. The transport vehicle of claim 13, wherein the controller increases the rate of raising of the load bin by the at least one load bin cylinder as the vehicle speed increases.

15. The transport vehicle of claim 13, wherein the controller raises load bin only when the vehicle inclination is below a predetermined angle.

16. The transport vehicle of claim 15, wherein the controller uses the vehicle inclination and weight of the material supported by the load bin to determine whether to raise the load bin.

17. The transport vehicle of claim 13, wherein the controller raises the load bin at a first rate based on a first type of material supported by the load bin and raises the load bin at a second rate based on a second type of material supported by the load bin, the first material being different than the second material and the second rate being slower than the first rate.

18. The transport vehicle of claim 13, wherein the controller determines the stability of the vehicle and only raises the load bin when the stability is above a predetermined level.

19. The transport vehicle of claim 13, wherein the controller determines the angle of the load bin.

20. The transport vehicle of claim 19, wherein the controller lowers the load bin after determining the angle of the load bin has reached a predetermined angle.

* * * * *